United States Patent Office 2,702,284
Patented Feb. 15, 1955

2,702,284

WATER DISPERSION PAINT CONTAINING BARIUM COMPOUND TO PREVENT BLOOMING

Marlyn J. Brock, Stow, Ohio, assignor to The Firestone Tire & Rubber Company, Akron, Ohio, a corporation of Ohio No Drawing. Application August 19, 1952, Serial No. 305,297

20 Claims. (Cl. 260—23.7)

This invention relates to water paints. More particularly it relates to water paints which include an aqueous polymer dispersion. This application is a continuation-in-part of my copending application Serial No. 257,958, filed November 23, 1951, now abandoned.

Water paints have been proposed having paint pigments dispersed in a natural or synthetic rubber latex. More recently more desirable water paints have been produced by incorporating paint pigments into aqueous latices of non-rubbery synthetic polymers. The present invention is concerned with the commercially new paints of the second type.

The non-rubbery synthetic polymer latices mentioned above may be produced by the aqueous emulsion polymerization of a minor proportion (less than 50 parts by weight) of one or more conjugated dienes with a major proportion (more than 50 parts by weight) of one or more ethylenic compounds polymerizable therewith. Suitable dienes are butadiene-1,3, isoprene, 2,3-dimethylbutadiene-1,3, piperylene, 2-chlorobutadiene-1,3, 2,3-dichlorobutadiene-1,3, 2-bromobutadiene-1,3, 2-flurobutadiene-1,3, 2,3-difluorobutadiene-1,3, and the like. Suitable compounds polymerizable with the dienes are the compounds containing a single aliphatic olefin group, and especially the ethylenic compounds each of which contains a

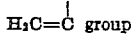

Examples include the vinyl aromatic compounds such as styrene, vinyl toluene, divinyl benzene, the nuclearly substituted styrenes such as the chlorostyrenes and alkyl styrenes, alpha-chlorostyrene, alpha-methylstyrene, vinyl-naphthalene, vinylpyridine, vinyl carbazole and the like; the alpha methylene carboxylic acids and esters, nitriles, aldehydes and amides thereof such as acrylic acid, acrylamide, methyl acrylate, methyl methacrylate, methacrylic acid, methacrylamide, acrolein, acrylonitrile, methacrylonitrile and the like; vinyl aliphatic compounds, such as vinyl chloride, vinyl bromide, vinyl fluoride, vinyl acetate, vinyl propionate, vinyl formate, vinyl methyl ether, vinyl ethyl ether, divinyl ether, vinyl ethyl sulfone, the vinyl thioethers, and the like; vinylidene fluoride, 1-chloro-1-fluoro-ethene, vinylidene cyanide, and the like; and alpha-olefins, such as isobutene, ethylene and propylene. The synthetic polymers may be copolymers, which include terpolymers and other interpolymers. A copolymer latex may be intermixed with one or more additional synthetic polymer latices; for example, a high styrene-low butadiene copolymer latex may be blended with a polystyrene latex. Alternatively, a rubbery polymer latex (for example, a 60-butadiene, 40-styrene copolymer latex) may be mixed with styrene, and the latter polymerized in the latex to produce a non-rubbery polymer latex for paint; or a resinous polymer latex (for example, polystyrene latex or a 70-styrene, 30-butadiene copolymer latex) may be mixed with butadiene (or mixture of any of the above monomers, rich in diene) and the latter polymerized in the latex to produce a suitable non-rubbery paint latex.

The polymerizations are effected in accordance with known procedures in presence of the usual polymerization catalysts, and in the presence of emulsifying agents, buffers, catalyst activators, retarders, modifiers, shortstopping agents and the like if desired. The polymerization procedures are comparable to and may be identical with the many well-known processes of manufacturing the various commercial synthetic rubbers known as GR–S, GR–A and GR–M.

Another type of synthetic polymer which may be incorporated in a water paint is known by the generic name of "silicones," either oily, resinous or rubbery. A relatively small amount of a silicone water dispersion or latex may be mixed into a water paint, alone or in addition to another polymer latex, to improve the washability and weather resistance of the paint film. The silicones may be prepared as is well known in the art, for example by reacting a silane, substituted by one or two hydrocarbon radicals and two halogens or alkoxy radicals, with water. The polymeric silicone may be dispersed in water by any of the well known dispersion techniques, several of which are described herein in connection with preparation of paint pigment masterbatches and polymer latices.

The aqueous polymer dispersions may then be mixed with paint pigments either in dry powder form or suitably dispersed in an aqueous medium. Usually the finished paints contain from about 10 to about 100 parts by weight of polymer per 100 parts of paint pigment, although as little as one part polymer may have utility.

By the terms "latex" and "dispersion" is meant an aqueous colloidal suspension or emulsion, the dispersed particles of which possess an average diameter of about ten milli-microns to one micron. It is desirable that the latex, and the water paint containing it, possess a relatively high mechanical stability in order to avoid formation of undesirable gel, floc or coagulum in the latex or paint during ordinary handling and processing operations.

The polymer latices may be mixed with most of the common paint pigments to produce a paint or coating composition of the water dispersion type, which dries to form an opaque film. The pigments may be added as dry powders to the latex if sufficient precautions, known to the art of compounding natural rubber latex, are taken to avoid coagulating the latex. However, it is preferred to form a water dispersion of the pigments first and then to mix this dispersion carefully with the latex.

Most paint pigments are hydrophobic and require the presence of a dispersing agent for the production of a water dispersion of the pigments suitable for mixing with the latex. Many of the dispersing agents known to the colloid art may be utilized, including the various water soluble soaps, the aliphatic or aromatic sulfonates, the sulfolignins, the aliphatic sulfates, and other anionic emulsifying agents on the market; various polyethers, ether-alcohol condensates and other nonionic emulsifying agents; and the various hydrophilic colloidal dispersing agents, including casein, soya bean protein and other animal and vegetable proteins (including albumens) capable of reacting with an alkaline material to become dispersible in water, cellulose ethers, such as methyl cellulose, and other water dispersible cellulose derivatives, as well as other hydrophilic colloids well known in the colloid art. Two or more dispersing agents may advantageously be used in a single paint.

Typical paint pigments which may be successfully incorporated with the polymer latex into a paint include titanium dioxide (the anatase or rutile grade is satisfactory), clay, silica, lithopone, mica, barium sulfate, talc and zinc sulfide. Many dyes and colored pigments may be included in the pigment formulation, including carbon black, iron oxides, cadmium yellows, phthalocyanines, ultramarine, chromium oxides, umber and sienna.

An example of a satisfactory paint of the flat interior type is a white paint utilizing casein as the pigment dispersing agent. It is well known in the paint industry that casein can be readily made dispersible in water by treating it with a water solution of an alkaline material, including ammonium, sodium or potassium hydroxide or an alkaline salt such as borax, sodium or potassium carbonate. For example, 10 parts of dry casein are added to 56 parts, by weight, of soft water, and the mixture is allowed to stand at ordinary room temperature for 30 to 60 minutes. Then the mixture is stirred and warmed to about 60° C. One part of borax is added to the warm mixture with stirring, and the mixture is stirred for an additional 30 minutes at 60° C. The casein dispersion is allowed to cool. Preferably a fungicide is added to the casein dispersion to protect it and the resulting paint from mold, etc.; e. g., 2 to 3 parts of a 20% solution of Dowicide A [1] (and a corresponding reduction of the original water, employed for dispersing the casein, from 56 to 53 or 54 parts) may be added to the cool casein dispersion.

A paint may be prepared in accordance with the following formula:

| Ingredients: | Parts by weight |
|---|---|
| Pigment(s) | 20 to 40 |
| Water | 14 to 30 |
| Casein dispersion | 1 to 10 |
| Antifoaming agent | 0.75 to 3 |
| Polymer latex | 20 to 55 |

A somewhat more detailed formula may be:

| Ingredients: | Parts by weight |
|---|---|
| Titanium dioxide | 2 to 25 |
| Lithopone | 3 to 12 |
| Silica and silicates | 4 to 12 |
| Color (if desired) | 3 to 12 |
| Water | 14 to 30 |
| Protein—dry (as a dispersion) | 1 to 3 |
| Antifoaming agent | 1.75 to 3 |
| Polymerized oil | 1 to 6 |
| Polymer latex | 25 to 55 |

The ingredients may be chosen in the ranges shown in the above formulas, depending upon the specific paint properties desired. The paint pigment masterbatch may be prepared by mixing the ingredients in a can by means of a conventional paddle stirrer. The water preferably containing about one percent of $Na_4P_2O_7$ or other soluble phosphate as a pigment dispersant, is stirred while the pigment or mixture of pigments is added. The mixture is stirred for several minutes to insure thorough wetting of the pigment. Then the casein dispersion is added and the mixture is stirred until uniform in appearance. An antifoaming agent, such as pine oil, tributyl phosphate or similar oily antifoamer is then added. Additional fungicide, amounting to 1 to 2 parts, may be added at this point to improve the resistance of the paint to fungi attack. Then the polymer latex is carefully added to the pigment masterbatch, with slow stirring, so as to avoid formation of foam, and the paint is slowly stirred for an additional period of 15 to 30 minutes. The mixed paint may then be filtered, if desired, and is ready for use or packaging.

Water paints containing non-rubbery or resinous synthetic polymer dispersions have met with considerable commercial success particularly because of their ease of application, their improved covering power and resistance to moisture. Many instances, however, have been observed in which a white to grayish, unsightly frost-like bloom appears on the paint surface a relatively short time after application of such paints, although in some cases the bloom does not appear until several months have elapsed. Such bloom is particularly prevalent when cool or damp humid atmospheric conditions attend the use of the paint, and especially if the paint has been applied to a freshly plastered surface.

It is therefore an object of the present invention to alleviate the above difficulties by providing a non-blooming polymer-containing water paint. A further object is to provide an improved water paint and an improved polymer latex. Another object is to provide methods of making the improved paint and latex.

The above and further objects are obtained in accordance with the invention by incorporating in a polymer-containing paint a relatively small proportion of a wide variety of barium compounds. Suitable barium compounds are those which will dissolve in the polymer latex, in the paint pigment masterbatch or in the final water paint to supply a concentration of dissolved barium ions no greater than 2 grams of barium ions per 100 grams of the polymer present in the latex or paint. In most cases 0.5 gram of barium ions per 100 grams of polymer is ample. Slightly soluble barium compounds possess the advantage that an excess over the amount necessary to form a saturated solution may be added to the latex or paint without giving rise to a barium ion concentration greater than 2 grams per 100 grams of the polymer. The more soluble barium compounds may be utilized if adequate precautions are taken to prevent the incorporation of the barium compound from causing coagulation, gelling or flocculation of the latex, pigment masterbatch or paint.

It has been found that some barium compounds influence the viscosity of the latex or paint. For example, a rather fluid polymer latex has been made more viscous by inclusion of barium tartrate, diglycolate or succinate. The resulting latices were more satisfactory, as to viscosity, for direct mixing with a pigment masterbatch to form water paints than was the original latex. Another unexpected benefit of adding these barium compounds was that their presence improved the freeze-stability of the latex and the paint into which the latex was incorporated.

In accordance with the invention a soluble barium compound may be made into a relatively dilute solution, e. g. 1 to 10% by weight, and the solution can be gradually added, with stirring, to a polymer latex or paint, up to a concentration of 2 grams of barium ions per 100 grams of polymer, without any gelling or coagulation occurring in the latex or paint. Suitable barium compounds which may be utilized in accordance with this technique of the invention include:

| | |
|---|---|
| Barium acetate | Barium iodide |
| Barium benzoate | Barium nitrate |
| Barium bromide | Barium nitrite |
| Barium butyrate | Barium oxide |
| Barium camphorate | Barium perchlorate |
| Barium chlorate | Barium permanganate |
| Barium chloride | Barium phenolate |
| Barium chloro-sulfo-acetate | Barium propionate |
| Barium cyanide | Barium salicylate |
| Barium dithionate | Barium silicate |
| Barium formate | Barium hydrosulfide |
| Barium gluconate | Barium tetrasulfide |
| Barium hydroxide | Barium trisulfide |
| Barium hypophosphite | Barium thiocyanate |

Prior to adding a barium compound to the polymer latex, paint pigment masterbatch or water paint, it is desirable to ascertain that the latex, masterbatch or paint contains appreciably more dispersing agent than merely enough to prevent gelling or coagulation by mechanical agitation. One or more dispersing agent of the type discussed above, in connection with the preparation of a pigment masterbatch by dispersing paint pigments in water, may be added to the latex, masterbatch or paint to insure adequate stability.

A water paint containing barium ions, produced as described above, did not bloom after application to a surface, whereas the identical paint without the added barium compound produced a painted surface which soon exhibited an undesirable bloom of frosty appearance. It is usually not necessary to add the maximum proportion of barium compound indicated above, in order to prevent or substantially to prevent the paint from blooming, as little barium compound as will contain about 0.01 gram of barium per 100 grams of polymer in the latex or paint often being of utility.

Because of the possible hazard of gellation or coagulation attending the use of the more soluble barium compounds, a preferred method of the invention makes use of one or more barium compounds which are only slightly soluble in water. Experiments have demonstrated that no gellation or coagulation ordinarily occurs upon incorporating even large proportions of such slightly soluble barium compound into the latex or paint, and that the paint containing such compound will not bloom after having been painted upon a surface. The preferred group of barium compounds are those which provide no greater concentration of barium ions in the latex or paint than one gram per 100 grams of the polymer present, the paint or latex being at 25° C. and some of the barium compound being present in undissolved form. Use of as little as 0.01 gram of barium per 100 grams of polymer is of utility. The slightly soluble barium compounds may be used in great excess over the amount required to prevent blooming of the paint, if desired, as much as 50 or 100 parts (expressed as barium) per 100 parts of polymer being satisfactory in many instances. In other words, the barium compound or compounds may replace a part or substantially all of the paint pigments normally employed, if desired.

The following groups of slightly soluble barium com-

---
[1] Sodium salt of ortho-phenyl phenol.

pounds, with examples listed for each group, are preferred in the practice of the invention:

Salts of C₈ to C₂₂ monocarboxylic aliphatic acids:
  Barium caprylate
  Barium pelargonate
  Barium caprate
  Barium undecylate
  Barium laurate
  Barium tridecylate
  Barium myristate
  Barium pentadecylate
  Barium palmitate
  Barium margarate
  Barium stearate
  Barium arachidate
  Barium behenate Salts of dicarboxylic aliphatic acids:
  Barium oxalate
  Barium malonate
  Barium succinate
  Barium glutarate
  Barium adipate
  Barium malate
  Barium itaconate
  Barium citraconate
  Barium tartrate
  Barium maleate
  Barium fumarate
  Barium diglycolate Salts of tricarboxylic acids:
  Barium tricarballylate
  Barium citrate
  Barium aconitate Salts of aromatic acids:
  Barium naphthoate
  Barium cinnamate
  Barium naphthalene sulfonates
  Barium anthraquinone sulfonates
  Barium anthracene sulfonates
  Barium phenanthrene sulfonates
  Barium p-iodobenzene sulfonate
  Barium p-chlorobenzene sulfonate
  Barium helianthate
  Barium naphthionates Salts of complex acids:
  Barium abietate
  Barium hydroabietate
  Barium naphthenates
  Barium truxilate
  Barium truxinate Salts of natural mixed acids:
  Barium salt of palm oil acids
  Barium salt of castor oil acids
  Barium salt of coconut oil acids
  Barium salt of cottonseed oil acids
  Barium salt of linseed oil acids
  Barium salt of corn oil acids
  Barium salt of soy bean oil acids
  Barium salt of peanut oil acids Barium salts of the following phenolic compounds:
  Picric acid
  Dinitrophenol
  Trichlorophenol
  Tribromophenol
  Catechol
  p-Phenylphenol
  Bis (p-tert-amylphenol) sulfide
  Alpha naphthol
  Beta naphthol
  Dibutyl-m-cresol
  Butyl-p-cresol Salts of miscellaneous organic compounds:
  Barium alkyl phosphates
  Barium aromatic phosphates
  Barium alkyl and aromatic phosphites
  Barium alkyl arsenates
  Barium aromatic arsenates
  Barium methionate
  Barium sulfo-acetate Inorganic compounds:
  Barium arsenate
  Barium bromate
  Barium carbonate
  Barium ferrocyanide
  Barium fluoride
  Barium fluosilicate
  Barium iodate
  Barium manganate
  Barium molybdate
  Barium peroxide
  Barium hypophopshate
  Barium di-ortho-phosphate
  Barium pyrophosphate
  Barium selenate
  Barium sulfite
  Barium tellurate
  Barium thiosulfate
  Barium thiotellurate
  Barium tungstate The specific barium compounds and classes thereof listed above are merely exemplary of the preferred compounds which may be utilized in the invention, as other slightly soluble barium compounds may be employed in the preferred practice of the invention, so long as a saturated solution of the compound in the latex or paint provides a concentration, at 25° C., of barium ions of at least 0.0003 gram per 100 grams of water present in the latex or paint.

In practicing the preferred invention, a barium compound or mixture of compounds selected from those referred to above is admixed into a water paint containing a polymer. The barium compound may be added to the polymer dispersion prior to admixing with the paint pigment either as a dry powder or as a slurry or dispersion. Alternatively the barium compound may be added to the polymer dispersion along with the paint pigments or paint pigment dispersion. Also the barium compound may be incorporated in the pigment masterbatch prior to mixing the latter with the latex, and excess undissolved barium compound may be substituted for some of the paint pigment normally employed, in this case as in the other methods. Still another means of incorporating the barium compound is to add it to an otherwise finished paint after the polymer dispersion and paint pigment have been admixed.

The preferred barium compounds suitable for practicing the invention may be produced in any known manner. Many of them are commercially available and may be used as such or, if necessary, reduced to smaller particle size prior to use. According to one method barium salts of organic acids are conveniently prepared by dissolving one mole of Ba(OH)₂ in 500 to 1000 ml. of boiling water, dissolving a stoichiometric proportion of an organic acid in water (or in alcohol if the acid is insoluble in water) and thereafter mixing the barium hydroxide and the acid solutions to precipitate the barium salt. The precipitate is often thereby obtained in finely divided form, highly suitable for mixing directly with a polymer latex or paint.

Most of the barium compounds mentioned above are colorless or white, and are thus suitable for use in white or light colored paints. The colored barium compounds may be incorporated in paints of deeper color, or in light colored paints if the color of the barium compound does not conflict.

*Example 1*

As an illustration of a preferred practice of the invention the following ingredients are charged into a polymerization reactor:

| | Parts by weight |
|---|---|
| Butadiene | 37 |
| Styrene | 63 |
| $K_2S_2O_8$ | 0.6 |
| MP–189–S [2] | 2.5 |
| $Na_2B_4O_7 \cdot 10H_2O$ | 0.8 |
| Water | 145 |

Polymerization is effected at 70° C. At about 60% conversion 2 parts by weight of Nacconal NRSF [3] is injected into the reactor. Polymerization is then com-

---

[2] An alkyl sodium sulfate supplied by E. I. du Pont de Nemours & Company.
[3] An alkyl aryl sulfonate supplied by National Aniline Division of the Allied Chemical and Dye Corporation.

pleted. A small amount of unreacted butadiene is then removed from the resulting latex by stripping in accordance with commercial synthetic rubber practice. The latex is then further stabilized by the addition of 2 parts GMR–S[4] and 1 part ammonium oleate, both by weight on the weight of polymer. To one of two equal portions of the stabilized latex 4.74 parts of barium malonate (calculated as the anhydrous salt) per 100 parts of polymer is added as an aqueous slurry; this amount furnishes 0.183 gram barium ions per 100 grams synthetic polymer. No barium compound is added to the other portion of the latex and it is maintained as a control. Water paints are produced by adding identical paint pigment dispersions to each of the two portions of latex above. Test panels are then painted under identical atmospheric conditions with each of the two paints. The test panel painted with the control paint (containing no added barium malonate) blooms. The test panel painted with the water paint containing a barium compound in accordance with the invention does not bloom.

*Example 2*

It has been observed that water paints having a tendency to bloom will bloom even more when painted over a painted surface which has already bloomed. A control paint and a barium malonate containing paint are produced in accordance with the details set out in Example 1. Each of these two paints is applied to a test panel already coated with a paint which has bloomed. The test panel painted with the control paint containing no barium malonate blooms; the test panel painted with the barium compound containing paint in accordance with the invention does not bloom.

*Example 3*

One mole (315.5 grams) of $Ba(OH)_2 \cdot 8H_2O$ is dissolved in 500 to 1000 ml. of boiling water.

One mole of a dibasic organic acid or two moles of a monobasic organic acid are dissolved in 200 to 800 ml. of boiling water (or alcohol in the case of acids which are insoluble in water).

The acid solution is added with stirring to the $Ba(OH)_2$ solution. A precipitate of the barium salt then forms. If the resulting mixture is not neutral, it should be neutralized by the addition of a small amount of an aqueous solution of $Ba(OH)_2$ or the organic acid whichever is appropriate. The finely divided precipitate is finally filtered off and dried at 115° C.

Barium salts of the following acids have been prepared in this manner:

Malonic
Lauric (soluble in alcohol)
Tartaric
Succinic
Malic
Diglycolic
Linseed oil acids (soluble in alcohol)

Barium malonate and barium laurate preparations need not be filtered but can be used as prepared in form of the aqueous pastes containing approximately 88 and 72% water, respectively.

*Example 4*

A latex containing 50% polymer is produced by copolymerizing styrene and butadiene in the ratio of 70 parts to 30 parts by weight, respectively, in a formula similar to that of Example 1, except as to water content. The latex is stabilized by addition of 1.5 parts of a mixture of anionic and non-ionic dispersing (or emulsifying) agents. About 0.2 gram of barium malonate is added to 203 grams of the latex containing 100 grams of the copolymer; this amount of barium compound corresponds to 0.115 gram of barium ions per 100 grams of polymer at 25° C. A water paint is produced by mixing the latex with a paint pigment masterbatch, and the paint is applied to a test panel. No bloom appears on the painted surface after the test panel has been exposed to a cool, humid atmosphere for several weeks.

*Example 5*

A latex (203 grams) containing 100 grams polymer,

---
[4] A soap modified glyceryl monoricinoleate supplied by Glyco Products Company.

as in Example 4, is mixed with 20 grams of barium malonate (as the anhydrous salt). The concentration of barium ions in the latex is found to be 0.125 gram per 100 grams of polymer at 25° C. One part by weight of the latex is mixed with 4 parts of a paint pigment masterbatch to produce a water paint which will not bloom. The concentration of barium ions in the paint (25% water) is found to be 0.35 gram per 100 grams of polymer at 25° C.

*Example 6*

A latex containing 100 grams polymer, as in Example 4, is mixed with 0.16 gram of finely divided barium fluoride. The concentration of barium ions in the latex is found to be 0.125 gram per 100 grams of polymer. The latex is further stabilized by addition of 5 parts of emulsifying agents, and then the stabilized latex is carefully mixed with 192 grams of dry pigments to produce a paint containing 25% water. The paint is found to contain 0.125 gram of barium ions per 100 grams of polymer. Another portion of the same preparation of latex employed in this example is treated in the same manner as above except that no barium fluoride or other barium compound is incorporated in the latex or paint therefrom. Such control paint displays a slight bloom after application to a surface kept in a cool, humid room for several days, whereas no bloom is produced when the paint containing the barium fluoride is similarly tested.

*Example 7*

A latex is produced by blending equal parts of a polystyrene latex and a latex prepared by aqueous copolymerization of 51 parts p-chlorostyrene and 49 parts of isoprene. The mixed latex, containing several percent of dispersing agents to insure mechanical and ionic stability, contains 35% synthetic polymers. A 50% water slurry containing 1 gram of barium malate is carefully mixed into 300 grams of the latex (another 300 gram portion being reserved as a control) to provide 0.486 gram barium ions per 100 grams polymer in the latex. The control latex is mixed with 3 parts by weight of a pigment masterbatch containing no barium compound to produce a control paint containing 30% water. A dried film of this control paint exhibits a white bloom after standing several days in a cool, humid atmosphere. A special pigment masterbatch is prepared containing 10% finely divided barium carbonate, the water content of this masterbatch being substantially equal to that of the pigment masterbatch employed in preparing the control paint. One part of the barium containing latex is mixed with 3 parts by weight of this special pigment masterbatch to produce a test paint containing 30% water. A dried film of this test paint does not bloom after prolonged exposure to a cool, humid atmosphere. The barium ion concentration in the test paint is 0.493 gram per 100 grams of polymer.

*Example 8*

A latex containing 45% polymer is prepared by polymerizing an aqueous emulsion containing butadiene, alpha-methylstyrene and acrylonitrile in the proportions of 35 to 60 to 5 parts by weight, respectively, and containing 2 parts $K_2S_2O_8$, 2.5 parts $Na_4P_2O_7$, 0.75 part MP–189–S and 120 parts water, for 8 hours at 70° C., the polymerized latex containing as additional stabilizer 2 parts of a mixture of equal proportions of ammonium oleate and glyceryl monoricinoleate. One part of the stabilized latex is mixed with 5 parts of a paint pigment masterbatch to provide a water paint containing 14% water. The paint is divided into two equal portions, one portion serving as the control paint. To 100 parts of the other portion there are added carefully, with stirring, 5 parts of a water paste containing 2 parts of barium stearate and one part of a non-ionic dispersing agent (condensate of ethylene oxide and an alkylphenol) to produce a test paint containing 0.008 gram of barium ions per 100 grams of polymer in the paint. Upon testing the two paints for blooming, as in previous examples, the test paint does not bloom, whereas the control paint film exhibits a characteristic frost bloom.

*Example 9*

An uninhibited polystyrene latex is mixed with chloroprene and submitted to polymerizing conditions. The resulting latex contains 40% by weight of polymer, which analysis indicates is composed of 80% polystyrene and 20% polychloroprene. The mixed polymer latex (250 grams) is stabilized by the addition of 3 parts by weight of mixed anionic and non-ionic dispersing agents. Four parts of a 50% water slurry of finely divided barium citrate ($Ba_3(C_6H_5O_7)_2 \cdot 7H_2O$) are mixed into the latex to produce a treated latex containing 0.037 gram of barium ions per 100 grams of polymer. One part of the treated latex is then blended with 3.5 parts by weight of a casein-dispersed paint pigment masterbatch. The resulting paint contains 22% water and 0.0646 gram barium ions per 100 grams polymer. No bloom is produced upon subjecting a film of the paint to a cool, humid atmosphere for several weeks.

*Example 10*

A latex containing 35% polymer is prepared by polymerizing the following ingredients for 16 hours at 50° C.:

| | Parts by weight |
|---|---|
| Butadiene | 40 |
| Styrene | 55 |
| Acrylonitrile | 5 |
| Water | 180 |
| $NaHSO_3$ | 0.6 |
| $K_2S_2O_8$ | 1.6 |

One part of a cationic emulsifying agent (octyl dimethyl benzyl ammonium chloride) is added to 100 parts of the latex, and then a solution of one part of barium chloride in 10 parts of water is gradually added to the acidic stabilized latex with stirring. The latex contains 1.88 grams of barium ions per 100 grams of polymer. A mixture of non-alkaline pigments is dispersed by means of a mixture of cationic and non-ionic dispersing agents to produce a pigment masterbatch having a pH slightly less than 7. One part of the latex is mixed with 4 parts of the masterbatch to produce a slightly acid paint, containing the same barium ion concentration in terms of polymer present. The paint does not bloom.

*Example 11*

An acidic latex polymerized as in Example 10 but containing 40% polymer (less water is employed during polymerization) is stabilized by the addition of 2 parts per 100 parts polymer of a mixture of non-ionic and anionic dispersing agents. A small amount of aqueous ammonia is added to raise the pH of the latex above 7. Then 5 parts (per 100 of polymer) of an aqueous paste, containing 2 parts of barium laurate and one part of sodium oleate, are mixed with the latex to provide a barium ion concentration of 0.0032 gram per 100 grams of polymer. One part of the resulting latex is mixed with 3 parts of paint pigment masterbatch, containing no protein but pigments dispersed by a mixture of anionic and non-ionic dispersing agents, to produce a paint containing 25% water. The barium ion concentration in the paint is 0.0054 gram per 100 grams polymer. The paint does not bloom.

*Example 12*

A neutral latex is prepared by polymerizing an aqueous emulsion of 35 parts butadiene, 63 parts styrene, one part of a non-ionic emulsifying agent and 2 parts of $K_2S_2O_8$. The latex, containing 41% polymer, is stabilized by addition of 2 parts per 100 of polymer of a mixture of anionic and non-ionic dispersing agents, and then there are added 10 parts of a 25% aqueous dispersion of the barium salts of castor oil fatty acids. A paint prepared by mixing the latex with a pigment masterbatch, as in previous examples, does not bloom.

The preceding examples are merely illustrative of the invention, since modifications and substitutions in the specific processes and ingredients given may be made by one skilled in the art, in practicing the invention as it is comprehensively described in this specification.

What is claimed is:

1. Method of producing an improved stable water paint which includes incorporating in a non-rubbery, resinous, conjugated diene polymer-containing water dispersion paint a barium compound in an amount sufficient to supply between 0.01 gram and 2 grams of barium ions per 100 grams of polymer present in the paint, without coagulation of the paint, the barium componnd providing, at 25° C., at least 0.0003 gram of barium ions per 100 grams of water in the paint, whereby blooming is suppressed on a dried film of the paint exposed to an ambient atmosphere containing a high relative humidity.

2. Method of preventing blooming during and after application of a stable water paint to a surface, which includes the step of incorporating in a non-rubbery, resinous, conjugated diene polymer-containing water dispersion paint a barium compound in an amount sufficient to supply between 0.01 gram and 0.5 gram of barium ions per 100 grams of polymer present in the paint, without coagulation of the paint, the barium compound providing, at 25° C., at least 0.0003 gram of barium ions per 100 grams of water in the paint, whereby blooming is suppressed on a dried film of the paint exposed to an ambient atmosphere containing a high relative humidity.

3. Method of producing a stable, unflocculated aqueous synthetic non-rubbery, resinous, conjugated diene polymer latex produced by polymerization of aqueous dispersed monomer, which includes incorporating in the latex a barium compound in an amount sufficient to supply between 0.01 gram and one gram of barium ions per 100 grams of polymer present in the latex, the barium compound providing, at 25° C., at least 0.0003 gram of barium ions per 100 grams of water in the latex.

4. A stable aqueous synthetic non-rubbery, resinous, conjugated diene polymer latex produced by polymerization of aqueous dispersed monomer, containing a barium compound in an amount sufficient to supply between 0.01 gram and 2 grams of barium ions per 100 grams of polymer present in the latex, the barium compound providing, at 25° C., at least 0.0003 gram of barium ions per 100 grams of water in the latex.

5. A stable non-rubbery, resinous, conjugated diene polymer-containing water dispersion paint containing a barium compound in an amount sufficient to supply between 0.01 gram and 2 grams of barium ions per 100 grams of polymer present in the paint, the barium compound providing, at 25° C., at least 0.0003 gram of barium ions per 100 grams of water in the paint, whereby blooming is suppressed on a dried film of the paint exposed to an ambient atmosphere containing a high relative humidity.

6. Method of producing a stable, unflocculated water dispersion paint, which includes incorporating in a synthetic non-rubbery, resinous, conjugated diene polymer latex, produced by polymerizing an aqueous dispersion of a major proportion of a monomer containing a simple $H_2C=C$— group and a minor proportion of a conjugated diene monomer, a barium compound in an amount sufficient to supply between 0.01 gram and 2 grams of barium ions per 100 grams of polymer present in the latex, the barium compound providing, at 25° C., at least 0.0003 gram of barium ions per 100 grams of water in the latex, and admixing the latex with paint pigments to produce a stable water paint, whereby blooming is suppressed on a dried film of the paint exposed to an ambient atmosphere containing a high relative humidity.

7. Method of producing a stable water dispersion paint, which includes dispersing paint pigments in water to produce a pigment masterbatch, incorporating in the masterbatch a barium compounds providing, at 25° C., at least 0.0003 gram of barium ions per 100 grams of water in the masterbatch, and admixing the masterbatch with a synthetic non-rubbery, resinous, conjugated diene polymer latex, produced by polymerizing an aqueous dispersion of a major proportion of a monomer containing a single $H_2C=C$— group and a minor proportion of a conjugated diene monomer, thereby to produce a water paint, sufficient barium compound being added to the masterbatch to provide between 0.01 gram and one gram of barium ions per 100 grams of polymer present in the paint, whereby blooming is suppressed on a dried film of the paint exposed to an ambient atmosphere containing a high relative humidity.

8. Method of producing an improved water dispersion paint, which includes the step of incorporating in an aqueous paint containing a non-rubbery, resinous, conjugated diene polymer, a water dispersion of a barium salt of an acid naturally occurring in a fat, said barium salt providing at 25° C. at least 0.0003 gram of barium ions per 100 grams of water in the paint, sufficient of said barium salt being incorporated to supply between 0.01 gram and 2 grams of barium ions per 100 grams of polymer present in the paint, without coagulation of the paint, whereby blooming is suppressed on a dried film of the paint exposed to an ambient atmosphere containing a high relative humidity.

9. Method of producing an improved stable water paint, which includes incorporating in an aqueous paint containing a non-rubbery, resinous, conjugated diene polymer, without coagulation of the paint, a quantity of a barium compound sufficient to suppress blooming in a dried film of the paint when exposed to an ambient atmosphere having a high relative humidity, the barium compound providing, at 25° C., at least 0.0003 gram of barium ions per 100 grams of water in the paint.

10. Method of producing an improved water dispersion paint, which includes reacting a water solution of barium hydroxide with a solution of an organic acid to provide an aqueous paste of the barium salt of said acid, and incorporating the paste in a synthetic non-rubbery, resinous, conjugated diene polymer-containing water paint, without coagulation of the paint, said barium salt providing at 25° C. at least 0.0003 gram of barium ions per 100 grams of water in the paint, sufficient barium salt being added to the paint to provide between 0.01 gram and two grams of barium ions per 100 grams of polymer present in the paint, whereby blooming is suppressed on a dried film of the paint exposed to an ambient atmosphere containing a high relative humidity.

11. Method of producing an improved water dispersion paint, which includes incorporating barium diglycolate into a water paint containing a synthetic non-rubbery, resinous, conjugated diene polymer, without coagulation of the paint, sufficient barium diglycolate being incorporated to supply between 0.01 gram and 2 grams of barium ions per 100 grams of polymer present in the paint, whereby blooming is suppressed on a dried film of the paint exposed to an ambient atmosphere containing a high relative humidity.

12. Method of producing an improved water dispersion paint, which includes incorporating barium citrate into a water paint containing a synthetic non-rubbery, resinous, conjugated diene polymer, without coagulation of the paint, sufficient barium citrate being incorporated to supply between 0.01 gram and 2 grams of barium ions per 100 grams of polymer present in the paint, whereby blooming is suppressed on a dried film of the paint exposed to an ambient atmosphere containing a high relative humidity.

13. Method of producing an improved water dispersion paint, which includes incorporating barium carbonate into a water paint containing a synthetic non-rubbery, resinous, conjugated diene polymer, without coagulation of the paint, sufficient barium carbonate being incorporated to supply between 0.01 gram and 2 grams of barium ions per 100 grams of polymer present in the paint, whereby blooming is suppressed on a dried film of the paint exposed to an ambient atmosphere containing a high relative humidity.

14. Method of producing a stable, unflocculated water dispersion paint, which includes admixing paint pigments with a synthetic non-rubbery, resinous, conjugated diene polymer latex, produced by polymerizing in the presence of potassium persulfate an aqueous dispersion of a major proportion of styrene and a minor proportion of butadiene-1,3, thereby to produce a paint, and incorporating in the paint, without coagulation thereof, a barium salt of an organic acid in an amount sufficient to supply between 0.01 gram and 2 grams of barium ions per 100 grams of polymer present in the paint, the barium salt providing, at 25° C., at least 0.0003 gram of barium ions per 100 grams of water in the paint, whereby blooming is suppressed on a dried film of the paint exposed to an ambient atmosphere containing a high relative humidity.

15. A stable water dispersion paint containing a non-rubbery, resinous, conjugated diene polymer and barium malonate, sufficient barium malonate being present to supply between 0.01 gram and 2 grams of barium ions per 100 grams of polymer present in the paint, whereby blooming is suppressed on a dried film of the paint exposed to an ambient atmosphere containing a high relative humidity.

16. A stable water dispersion paint containing a non-rubbery, resinous, conjugated diene polymer and barium stearate, sufficient barium stearate being present to supply between 0.01 gram and 2 grams of barium ions per 100 grams of polymer present in the paint, whereby blooming is suppressed on a dried film of the paint exposed to an ambient atmosphere containing a high relative humidity.

17. A stable water dispersion paint containing a non-rubbery, resinous, conjugated diene polymer and barium diglycolate, sufficient barium diglycolate being present to supply between 0.01 gram and 2 grams of barium ions per 100 grams of polymer present in the paint, whereby blooming is suppressed on a dried film of the paint exposed to an ambient atmosphere containing a high relative humidity.

18. A stable water dispersion paint containing a non-rubbery, resinous, conjugated diene polymer and barium citrate, sufficient barium citrate being present to supply between 0.01 gram and 2 grams of barium ions per 100 grams of polymer present in the paint, whereby blooming is suppressed on a dried film of the paint exposed to an ambient atmosphere containing a high relative humidity.

19. A stable water dispersion paint containing a non-rubbery, resinous, conjugated diene polymer and barium carbonate, sufficient barium carbonate being present to supply between 0.01 gram and 2 grams of barium ions per 100 grams of polymer present in the paint, whereby blooming is suppressed on a dried film of the paint exposed to an ambient atmosphere containing a high relative humidity.

20. A stable unflocculated water dispersion paint containing a non-rubbery, resinous, conjugated diene polymer and also including a barium compound in an amount sufficient to supply between 0.01 gram and 0.5 gram of barium ions per 100 grams of polymer present in the paint, the barium compound providing, at 25° C., at least 0.0003 gram of barium ions per 100 grams of water in the paint.

References Cited in the file of this patent

UNITED STATES PATENTS

| Number | Name | Date |
| --- | --- | --- |
| 2,278,207 | Mathes | Mar. 31, 1942 |
| 2,382,417 | Hendricks | Aug. 14, 1945 |
| 2,416,232 | Soday | Feb. 18, 1947 |
| 2,419,512 | Vesce | Apr. 22, 1947 |
| 2,537,114 | Young et al. | Jan. 9, 1951 |

OTHER REFERENCES

Burr et al.: Paint Oil and Chem. Rev., April 27, 1950, pages 8, 9, 10, 12 and 15.